US007688742B2

(12) United States Patent
Sridhar et al.

(10) Patent No.: US 7,688,742 B2
(45) Date of Patent: Mar. 30, 2010

(54) SYSTEM AND METHOD FOR MONITORING END NODES USING ETHERNET CONNECTIVITY FAULT MANAGEMENT (CFM) IN AN ACCESS NETWORK

(75) Inventors: Kamakshi Sridhar, Plano, TX (US); Sven Ooghe, Ghent (BE); Maarten Petrus Joseph Vissers, Huizen (NL); Atiya Suhail, Plano, TX (US)

(73) Assignee: Alcatel Lucent, Paris (FR)

( * ) Notice: Subject to any disclaimer, the term of this patent is extended or adjusted under 35 U.S.C. 154(b) by 1132 days.

(21) Appl. No.: 11/317,296

(22) Filed: Dec. 22, 2005

(65) Prior Publication Data
US 2006/0159008 A1 Jul. 20, 2006

Related U.S. Application Data

(60) Provisional application No. 60/656,487, filed on Feb. 25, 2005, provisional application No. 60/643,945, filed on Jan. 14, 2005.

(51) Int. Cl.
*G01R 31/08* (2006.01)
(52) U.S. Cl. .................................. 370/241.1; 370/467
(58) Field of Classification Search .................. 370/216, 370/236.2, 241, 242, 389, 401, 241.1, 467, 370/469
See application file for complete search history.

(56) References Cited

U.S. PATENT DOCUMENTS 6,405,251 B1  6/2002  Bullard et al.
6,614,781 B1  9/2003  Elliott et al.
6,751,663 B1  6/2004  Farrell et al.
6,813,634 B1 * 11/2004  Ahmed ........................ 709/224
2004/0105434 A1 *  6/2004  Baw ............................ 370/355
2005/0249124 A1 * 11/2005  Elie-Dit-Cosaque et al. ........................... 370/242
2006/0003765 A1 *  1/2006  Patil et al. ................. 455/432.1
2007/0025256 A1 *  2/2007  Hertoghs et al. ......... 370/236.2

FOREIGN PATENT DOCUMENTS

WO    2004008710 A1    1/2004

* cited by examiner

Primary Examiner—Seema S Rao
Assistant Examiner—Mon Cheri S Davenport
(74) Attorney, Agent, or Firm—Garlick, Harrison & Markison, LLP

(57) ABSTRACT

A system and method for monitoring end nodes using Ethernet Connectivity Fault Management (CFM) in an access network. In one embodiment, a broadband access server (BRAS) is operable to generate an Ethernet CFM frame that includes a query message with respect to a particular end node. An interworking function (IWF) entity associated with an access node that services the particular end node is operable to interpret the Ethernet CFM frame and construct a corresponding query message in a native protocol compatible with the particular end node. Upon receiving a reply message from the particular end node, the IWF entity constructs a suitable reply Ethernet CFM frame for transmission to the BRAS, wherein the reply Ethernet CFM frame includes a response corresponding to the reply message from the end node.

18 Claims, 3 Drawing Sheets

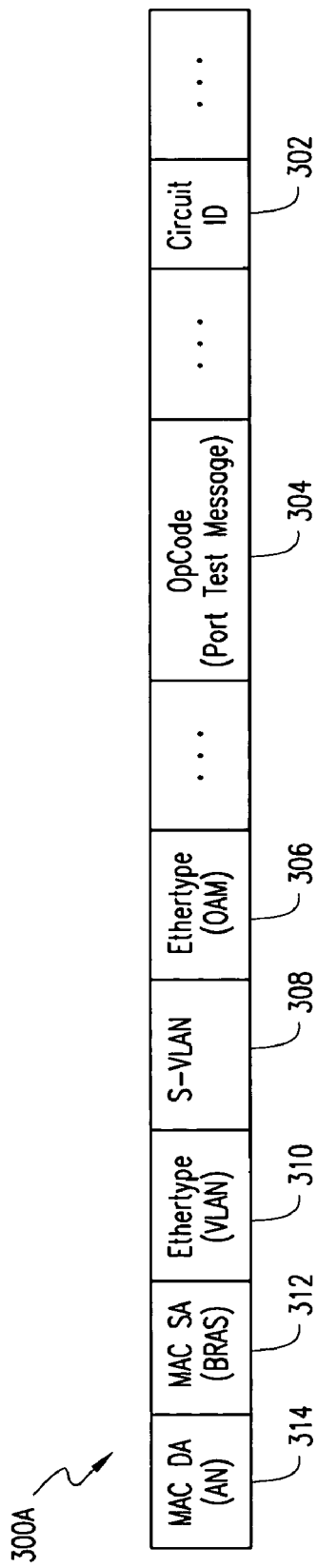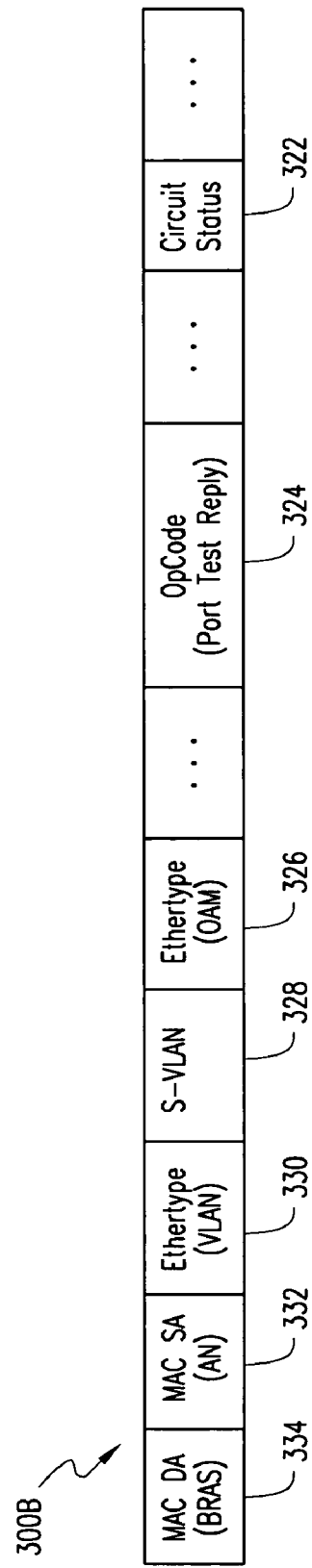
FIG. 3A
FIG. 3B

SYSTEM AND METHOD FOR MONITORING END NODES USING ETHERNET CONNECTIVITY FAULT MANAGEMENT (CFM) IN AN ACCESS NETWORK

PRIORITY UNDER 35 U.S.C. §119(e) & 37 C.F.R. §1.78

This nonprovisional application claims priority based upon the following prior United States provisional patent application(s): (i) "INTERWORKING BETWEEN METRO ETHERNET AND ACCESS OAM," Application No. 60/643,945, filed Jan. 14, 2005, in the name(s) of: Kamakshi Sridhar, Sven Ooghe, Maarten Petrus Joseph Vissers and Atiya Suhail; and (ii) "BROADBAND ACCESS END-TO-END CONNECTIVITY TESTING WITH CFM OAM IN THE ACCESS NETWORK," Application No. 60/656,487, filed Feb. 25, 2005, in the name(s) of: Kamakshi Sridhar, Sven Ooghe, Maarten Petrus Joseph Vissers and Atiya Suhail; each of which is hereby incorporated by reference.

BACKGROUND OF THE INVENTION

1. Technical Field of the Invention

The present invention generally relates to access networks that incorporate Ethernet aggregation. More particularly, and not by way of any limitation, the present invention is directed to a system and method for monitoring end nodes using Ethernet Connectivity Fault Management (CFM) functionality.

2. Description of Related Art

Current first/last mile access network solutions have significant shortcomings from subscribers' perspective, ranging from performance bottlenecks, fixed bandwidth provisioning, limited scalability, lack of flexibility and provisioning complexity to end-to-end quality of service (QoS) issues and a high cost structure. Application of robust, simple Ethernet technology in the first mile promises to revolutionize the access network as it did in the arena of enterprise networks where it started out as a local area network (LAN) transport technology that is used to communicate between computers and networks. As an access technology, Ethernet offers three significant advantages over legacy first mile technologies: (i) future-proof transport for data, video and voice applications; (ii) cost-effective infrastructure for data services; and (iii) simple, globally accepted standard that will ensure interoperability.

In order to adapt the Ethernet technology in a carrier-grade service environment, various standards are being developed that aim to provide advanced Operations, Administration and Management (OAM) capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet CFM plane is envisioned as a hierarchically layered domain space wherein specific CFM domains (or, synonymously OAM domains) are defined corresponding to the constituent network infrastructure and provisioning. In particular, two standards, IEEE 802.1ag and ITU-T draft Recommendation Y.17ethoam, incorporated by reference herein, that are specifically concerned with end-to-end Ethernet CFM define a customer-level domain at the highest level of hierarchy, which comprises one or more provider domains (occupying an intermediate level), each of which in turn includes one or more operator domains disposed at a lower hierarchical level. By way of standardization, the CFM domain space may be partitioned into a number of levels, e.g., 8 levels, each domain corresponding to a particular level, wherein a domain is defined in terms of what are referred to as flow points. In the context of the IEEE 802 specification suite, the flow points are new entities contained in the Media Access Control (MAC) "interfaces" and "ports" as defined in related standards documentation. A port can implement multiple flow points of different types. The flow points are generally referred to as ETH flow points and bound either a "Maintenance End Point" or MEP compound function or a "Maintenance Intermediate Point" or MIP compound function. Typically, the MEP compound functions are disposed at the edge of a CFM domain whereas the MIP compound functions are disposed inside a domain and remain visible to the bounding MEP functions. A node may implement a MIP function, a MEP function, or both, depending on how the domains are configured. Accordingly, the terms "MEP node" and "MIP node" may be used to loosely define a node functionality that implements a MEP compound function and a node functionality that implements a MIP compound function, respectively, although they may be defined on one single node. Whereas MEP "nodes" are used by system administrators to initiate and monitor CFM activity (by issuing appropriate CFM frames), MIP "nodes" passively receive and respond to CFM flows initiated by MEP "nodes".

A CFM domain having one or more MIP nodes may be bounded by a plurality of MEP nodes. In order that CFM frame flows are appropriately filtered so that they are processed only by the intended domain's nodes, the MEP/MIP population of an Ethernet CFM network is configured appropriately. For instance, in accordance with the current standards, an integer value may be provided to indicate a specific domain level of an Ethernet CFM hierarchy.

Moreover, standards are also being specified to enhance service delivery technologies, which allow provisioning of Virtual LANs (VLANs) on top of a Data Link Layer (i.e., Layer-2 or L2) Ethernet network for adding flexibility, scalability and security to the CFM network. VLANs may be defined on different levels, e.g., customer-level, provider-level, etc., and can include any number of non-intersecting CFM domains. Service frame fields preceded with a "C-", e.g., C-VLAN ID, refers to customer-created fields. Likewise, service frame fields preceded with a "S-" (e.g., S-VLAN ID), refer to service provider-added fields. By implementing VLANs, an end-to-end Ethernet CFM network may be partitioned into a number of service instances while preserving multiple subscribers' C-VLANs, wherein the traffic in a given VLAN is invisible to end hosts belonging to a different VLAN, thus reducing the broadcast domain.

Although the Ethernet CFM architecture as currently being standardized provides an impressive framework for addressing end-to-end Ethernet Connectivity and Fault Management at any level of the hierarchy, a number of issues remain to be solved. Of particular concern is the monitoring of end nodes where access links that couple the end nodes (i.e., customer network sites) to a metro provider network may operate in a non-802.1ag environment, whereas the metro provider network may comprise an 802.1ag-compliant network.

SUMMARY OF THE INVENTION

In one aspect, the present invention is directed to a monitoring method operable with an access network for testing, querying, or otherwise monitoring end nodes using Ethernet CFM in the access network. The access network includes at least one access node connected to one or more end nodes and a broadband access server (BRAS) connected to a regional Ethernet network. In one embodiment, the method comprises: generating by the BRAS an Ethernet CFM frame directed to an access node associated therewith, wherein the Ethernet CFM frame includes a query message with respect to a particular end node served by the access node; interpreting the Ethernet CFM frame by an interworking function (IWF) entity associated with the access node and constructing a corresponding query message in a native protocol compatible with respect to the particular end node; responsive to the corresponding query message from the access node, generating by the particular end node a reply message in the same native protocol or a different native protocol directed to the access node; interpreting the reply message by the IWF entity and constructing a reply Ethernet CFM frame including a response that corresponds to the reply message from the end node; and transmitting the reply Ethernet CFM frame to the BRAS.

In another aspect, the present invention is directed to a monitoring system associated with an access network, wherein the access network includes at least one access node connected to one or more end nodes and a BRAS node connected to a regional Ethernet network. In one embodiment, the system comprises: means associated with the BRAS for generating an Ethernet CFM frame directed to an access node associated therewith, wherein the Ethernet CFM frame includes a query message with respect to a particular end node served by the access node; IWF means associated with the access node for interpreting the Ethernet CFM frame and constructing a corresponding query message in a native protocol compatible with respect to the particular end node; means associated with the particular end node, operable responsive to the corresponding query message from the access node, for generating a reply message in the same native protocol or a different native protocol directed to the access node, wherein the IWF means operates to interpret the reply message in the native protocol and constructs a reply Ethernet CFM frame including a response that corresponds to the reply message from the end node, the reply Ethernet CFM frame for transmission to the BRAS.

In yet another aspect, the present invention is directed to a network element operable in an access network, comprising: a logic structure adapted to interpret an Ethernet CFM frame received from a BRAS node disposed in the access network, the Ethernet CFM frame including a query message with respect to an end node served by the network element operating as an access node; a logic structure adapted to construct a corresponding query message in a native protocol compatible with the end node, the corresponding query message being based on the query message in the Ethernet CFM frame; a logic structure adapted to interpret a reply message provided by the end node responsive to the corresponding query message, the reply message being compatible with the same native protocol or a different native protocol; and a logic structure adapted to construct a reply Ethernet CFM frame including a response that corresponds to the reply message received from the end node, the reply Ethernet CFM message for transmission to the BRAS.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

FIGS. 3A and 3B depict exemplary Ethernet CFM frames operable for effectuating port testing according to one embodiment of the present invention.

DETAILED DESCRIPTION OF THE DRAWINGS

Figure 1:
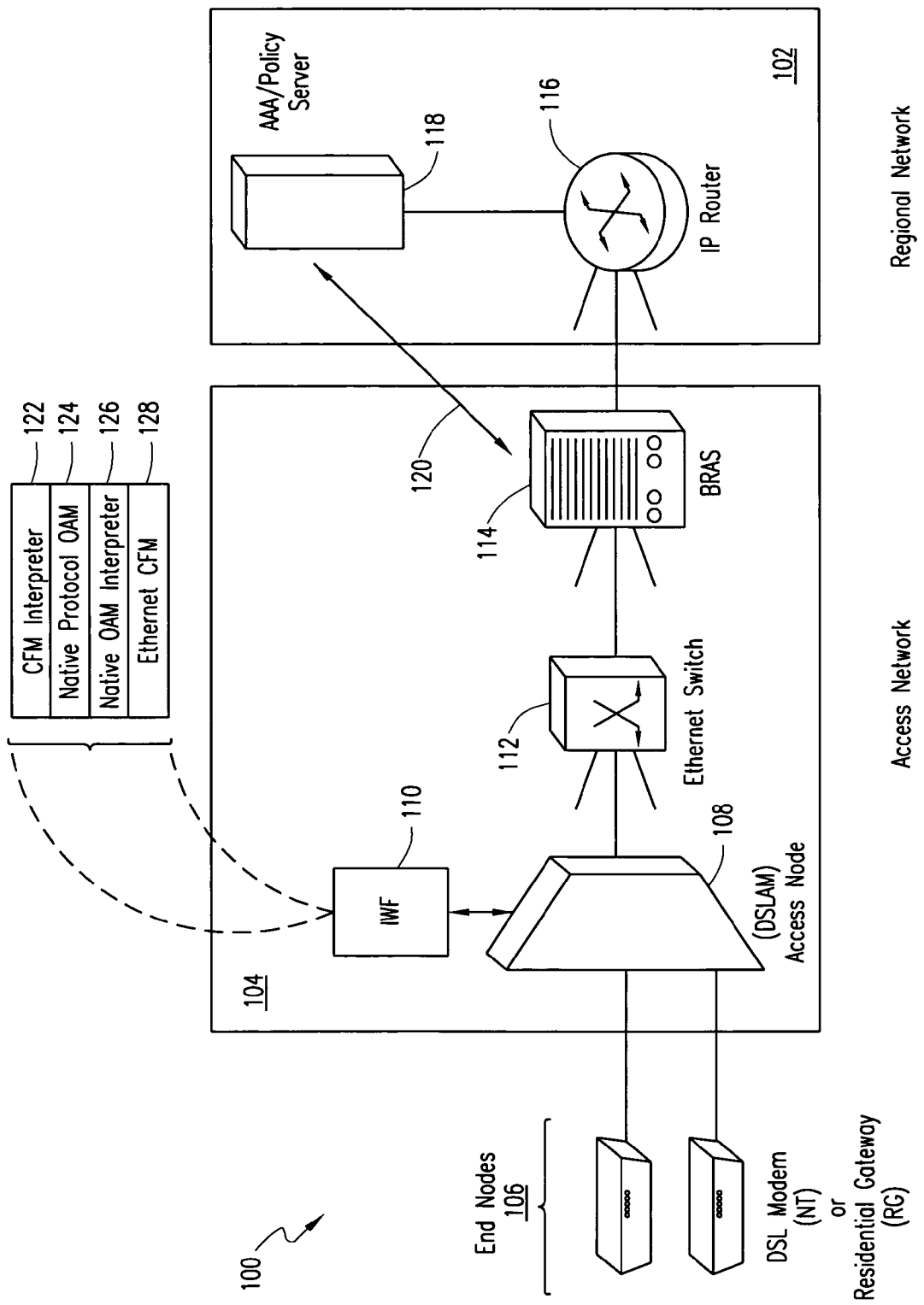
FIG. 1 depicts an exemplary network arrangement including an access portion with Ethernet aggregation wherein an embodiment of the present patent disclosure may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network arrangement 100 including an access portion 104 with Ethernet aggregation wherein an embodiment of the present patent disclosure may be practiced for monitoring an end node using Ethernet CFM messaging. Preferably, the Ethernet CFM messaging is maintained in-band with respect to the data transmission path in the access network. A regional or metro Ethernet network 102 including one or more routers 116 and one or more Authentication, Authorization and Accounting (AAA) servers 118 is operably coupled to the access network portion 104. In a typical deployment, the infrastructure of the access network 104 may include one or more access nodes 108 that may be aggregated via an Ethernet switch 112 to a broadband access server (BRAS) node 114. For purposes of the present patent disclosure, the access network 104 may be comprised of any type of first/last mile access network technology in general (e.g., Digital Subscriber Line (xDSL), Ethernet in First Mile (EFM), Asynchronous Transmission Mode (ATM), etc.), which may be implemented using diverse physical transport media (such as wireless, wireline, all-optical, electro-optical, and the like). Accordingly, one skilled in the art should recognize that the access network infrastructure may include appropriate access node elements (e.g., one or more DSL Access Multiplexer or DSLAM elements) depending on particular deployment, wherein the elements are suitably adapted for Ethernet aggregation via other Ethernet-compatible elements such as Ethernet switch 112 and BRAS 114.

Regardless of the type of access network technology, the access node 108 is operable to serve one or more end nodes 106 generally located at customer premises. End nodes 106 may be comprised of different equipment, e.g., DSL modems, network termination (NT) units, residential gateway (RG) units, etc., at least in part due to the differences in the underlying access network technologies. For purposes of the present disclosure, the end nodes 106 may also be generally referred to as "ports," which may be monitored or queried by associated access node element 108 using appropriate OAM messaging in one or more "native" protocols. Depending on the access network technology, for example, the native protocols compatible with the end nodes 106 and the access node 108 may be operable with EFM OAM messaging, ATM OAM messaging, and the like.

An interworking function (IWF) entity 110 is advantageously provided in association with the access node 108, either integrated therewith or otherwise, for effectuating Ethernet CFM functionality with respect to one or more of the end nodes 106. Essentially, IWF 110 is operable as an OAM proxy that defines a MEP node within an Ethernet CFM domain including other MEP entities such as BRAS 114, whereby an in-band maintenance channel may be effectuated between a management node, e.g., BRAS 114 and an access node and associated IWF. In general, BRAS 114 may be operable responsive to a BRAS management action such as a request 120 by AAA server 118 for initiating a CFM port test/query with respect to monitoring a particular end node (e.g., loopback). In operation, IWF 110 provides bi-directional protocol interpretation capability such that when a management node issues an Ethernet CFM frame pursuant to a port test query, a logic structure 122 of the IWF entity 110 is adapted to interpret the Ethernet CFM frame that includes an appropriate query message with respect to a particular end node identified within the frame. The particular end node may comprise a physical port or a logical port, e.g., associated with a permanent virtual circuit or connection (PVC). Another logic structure 124 is adapted to a construct a corresponding query message in a native protocol compatible with the identified end node. Where the IWF entity 110 is configured as a MEP node within an Ethernet CFM domain defined on a VLAN, the IWF entity 110 includes appropriate logic to resolve port addressing whether a 1:1 port addressing scheme or an N:1 port addressing scheme is utilized by the VLAN. Associated logic structure 126 is operable to interpret a reply message provided by the end node responsive to the corresponding query message in native protocol. Another logic structure 128 is adapted to construct a reply Ethernet CFM frame including a response that corresponds to the reply message received from the end node, which reply Ethernet CFM frame is transported back to the management node, i.e., BRAS 114, that initiated the port test/query loopback.

As alluded to hereinabove, the IWF entity 110 may be integrated within the access node 108, wherein the various logic structures adapted to effectuate the functionality set forth above may be combined in any combination, in software, firmware, program code, etc. Regardless of the exact implementation, those skilled in the art should recognize that the provisioning of the IWF entity 110 in association with the access node 108 supports a distinct maintenance channel that follows the data path, wherein a craftsperson can initiate port loopback monitoring at a relevant point of access, e.g., BRAS 114. In order to ensure seamless interoperability between Ethernet CFM with existing access network OAM (such as, e.g., ATM OAM, EFM OAM, etc.), the functionality of IWF 110 may be implemented within a number of constraints. For example, the IWF logic may be required to be compatible with current as well as future DSL modem technologies. Also, where Ethernet CFM domains involving the access network are defined over a VLAN, the IWF logic may need to support multiple VLAN address assignment schemes (i.e., 1:1 and N:1 VLANs). In addition, the IWF functionality should preferably be operable with both bridged and routed encapsulation (i.e., tunneling) on the access line path in consideration. Exemplary bridged encapsulation implementations may include Internet Protocol (IP)/Point-to-Point Protocol over Ethernet (PPPoE)/Eth/ATM/DSL as well as IP/Eth/ATM/DSL. Representative embodiments of routed encapsulation include, e.g., IP/PPP/ATM/DSL and IP/ATM/DSL.

Figure 2:
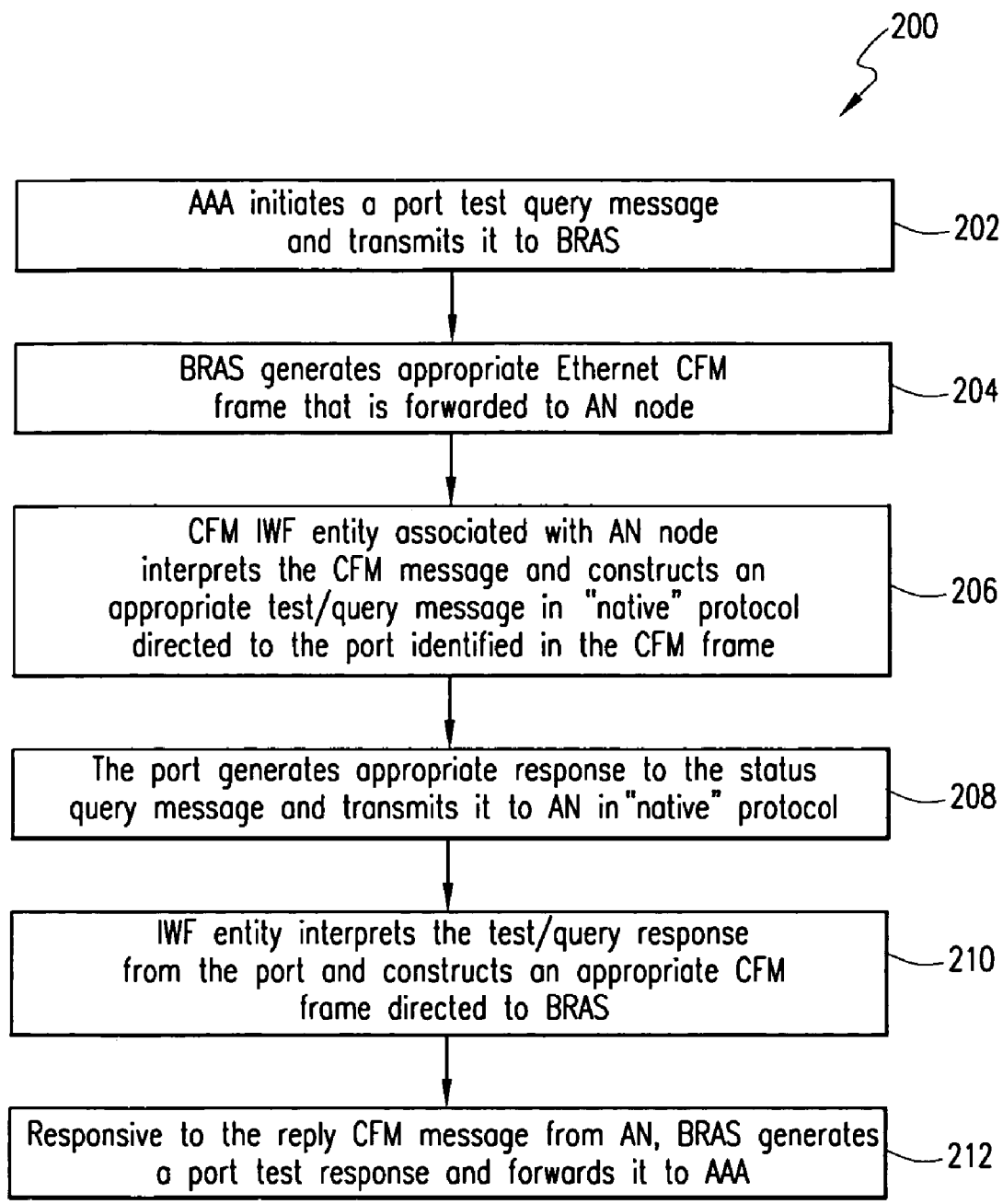
FIG. 2 depicts an exemplary scheme according to one embodiment for effectuating port testing with Ethernet CFM in the network arrangement shown in FIG. 1.

FIG. 2 depicts an exemplary port monitoring scheme 200 according to one embodiment operable with the network arrangement 100 described above with reference to FIG. 1. A policy administration node, e.g., AAA server node 118, disposed in a regional metro Ethernet is operable to initiate a port test/monitor query message towards a BRAS in the access network associated therewith (block 202). Responsive thereto, BRAS generates an appropriate Ethernet CFM frame which includes the query towards a particular AN/IWF entity in the access network (block 204). The IWF logic associated with the AN node interprets the CFM message and constructs an appropriate test/query message (e.g., port status) in a native protocol directed to the port or end node identified in the CFM frame (block 206). Upon receiving the query message in native protocol, the end node generates a response (e.g., port alive, port not alive, no response, error response, garbage reply, etc.) and transmits the same to the AN node (block 208), either in the same native protocol or in a different native protocol. Thereafter, the IWF entity associated with the AN node interprets the test/query response from the end port and constructs an appropriate Ethernet CFM frame directed towards BRAS (block 210). Responsive to the reply CFM frame from the AN node, BRAS generates a port test response and forwards it to the policy server (block 212).

In order to support an Ethernet CFM maintenance channel via appropriate IWF functionality in the access network, a new Ethernet CFM frame is introduced wherein a suitable OpCode field defines the type of port query/test message (e.g., port loopback) and the payload carries the contents relating to query messages and reply responses. In one direction, the Ethernet CFM frame is intended for the AN/IWF entity that services the particular end node identified in the payload. By way of example, the payload may implement a Type/Length/Value (TLV) encoding to specify the end node (e.g., DSL port/shelf/VPI/VCI identifier), among other parameters as will be described below. Alternatively, the payload could use a Link Access Procedure on the D Channel (LAPD) mechanism that creates a bitstream with respect to a particular target. Regardless of the implementation, it should be realized that the semantics of the port test/query and reply response may preferably be contained within the payload using suitable TLV encoding.

FIGS. 3A and 3B depict exemplary Ethernet CFM frames operable for effectuating port testing according to one embodiment of the present invention. Reference numeral 300A refers to an Ethernet CFM frame generated by a BRAS entity with respect to a particular end node specified in a Circuit ID field 302. An OpCode field 304 indicates the type of port test message. An EtherType field 306 identifies the frame as a CFM frame. Depending on the addressing scheme, both S-VLAN ID field 308 as well as EtherType VLAN field 310 may be provided. A Source Address (SA) field 312 identifies the BRAS's MAC address and a Destination Address (DA) field 314 identifies the AN/IWF entity's MAC address.

A reply Ethernet CFM frame 300B includes similar fields, e.g., EtherType VLAN 330, S-VLAN ID field 328 and EtherType OAM/CFM field 326. In this case, however, DA field 334 identifies the BRAS and SA field 332 identifies the AN/IWF entity that has received a reply message from the end node responsive to the test/query message from the BRAS. An OpCode field 324 indicates the type of port test reply message. The results of the port testing are included in a Circuit Status field 322 which provides a suitable TLV encoding therefor. For example, it may indicate "G.992.1 up", "1.610 LB down", or "802.3ah Loopback up", and the like. Additionally, although not particularly shown, more detailed information (e.g., "802.1ag MEP Address") may also be provided in the reply Ethernet CFM frame 300B via optional TLVs.

It should be recognized that although the frame embodiments 300A and 300B appear to depict the respective OpCode fields 304 and 324 on the same level as the corresponding Ethertype fields 306 and 326, the OpCode fields are in fact on a different level in the sense that these OpCode fields are used to introduce an additional communication channel between the BRAS and DSLAM points, wherein the PDU contents (i.e., the OAM payload) define one or more messages, such as the port test messages or port test reply messages described above. When a TLV encoding scheme is employed, the TLV-TYPE field is operable to carry the port test message or port test reply message code, the TLV-LENGTH field is operable to carry the length of the TLV, and the TLV-VARIABLE field is operable to carry the end node or Circuit ID 302 in a suitable format, e.g., DSL port/shelf/VPI/VCI identifier, or C-VLAN ID, or other format.

Regardless of the VLAN port addressing scheme, the AN/IWF entity is operable to map the port identifier used by the BRAS to a unique physical/logical entity (i.e., end node) on the subscriber side. In a 1:1 VLAN port addressing scheme, each end user is uniquely identified by a {C-VLAN ID; S-VLAN ID}-tuple that maps to a particular port. Whereas S-VLAN ID 308 is provided as part the Ethernet CFM frame header, the C-VLAN ID may be encoded as Circuit ID TLV 302 as described above. In N:1 VLAN port addressing, the end ports are not uniquely identified by {C-VLAN ID; S-VLAN ID}-tuples since there is no C-VLAN ID per user. Rather, the end ports are differentiated via Circuit ID only. Accordingly, in the 1:1 scheme, the TLV-VARIABLE may carry a C-VLAN ID as a Circuit or end node identifier; whereas in the N:1 VLAN addressing scheme, the DSL port/shelf/VPI/VCI identifier could be used as identifier of the circuit/end node. The BRAS may therefore provide additional addressing information within the port test message payload, e.g., by using a Circuit ID TLV encoding similar to the DSL port identification techniques specified for Dynamic Host Control Protocol (DHCP) and PPPoE.

Based on the foregoing Detailed Description, it should be appreciated that the representative embodiments of the present patent disclosure advantageously provide an effective scheme for extending Ethernet CFM capabilities to the end nodes in an access network. For example, connectivity testing and monitoring may be implemented from a central access point (e.g., BRAS) that is independent of any existing out-of-band element management system (EMS) deployed for testing DSLAM nodes in the access network. Further, the CFM procedures for end node monitoring as provided in accordance with the teachings herein may preferably implemented independent of the access link technologies. Those skilled in the art should recognize that the embodiments set forth herein can be practiced in an implementation involving software, hardware, or firmware, or any combinations thereof, associated with appropriate network equipment.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A monitoring method operable with an access network for monitoring end nodes using Ethernet Connectivity Fault Management (CFM) functionality, wherein said access network includes at least one access node connected to one or more end nodes and a broadband access server (BRAS) connected to an Authentication, Authorization and Accounting (AAA) server in a regional Ethernet 802.1ag-compliant network, comprising:

responsive to an action from the AAA server in the regional Ethernet network, generating by said BRAS an Ethernet CFM frame directed to an access node, wherein said Ethernet CFM frame includes a field that defines a type of query message and a payload that includes an identification of a particular end node served by said access node;

interpreting said Ethernet CFM frame by an interworking function (IWF) entity associated with said access node and constructing a corresponding query message in a native protocol compatible with respect to said particular end node;

responsive to said corresponding query message from said access node, generating by said particular end node a reply message in said native protocol directed to said access node;

interpreting said reply message by said IWF entity and constructing a reply Ethernet CFM frame including a response that corresponds to said reply message; and transmitting said reply Ethernet CFM frame to said BRAS; and responsive to the reply Ethernet CFM frame, generating a response by the BRAS to the action from the AAA server and transmitting the response to the AAA server.

2. The monitoring method operable with an access network as recited in claim 1, wherein said IWF entity associated with said access node is defined as a Maintenance End Point (MEP) that is part of an Ethernet CFM domain including said BRAS.

3. The monitoring method operable with an access network as recited in claim 1, wherein said Ethernet CFM frame is generated by said BRAS responsive to a port query message from the AAA server operably coupled to said access network.

4. The monitoring method operable with an access network as recited in claim 1, wherein said native protocol is operable with Ethernet in First Mile (EFM) Operations, Administration and Management (OAM) messaging.

5. The monitoring method operable with an access network as recited in claim 1, wherein said native protocol is operable with Asynchronous Transfer Mode (ATM) Operations, Administration and Management (OAM) messaging.

6. The monitoring method operable with an access network as recited in claim 1, wherein said IWF entity associated with said access node comprises a Maintenance End Point (MEP) that is part of an Ethernet CFM domain defined on a Virtual Local Area Network (VLAN).

7. The monitoring method operable with an access network as recited in claim 6, wherein said VLAN is operable with a 1:1 port addressing scheme.

8. The monitoring method operable with an access network as recited in claim 6, wherein said VLAN is operable with an N:1 port addressing scheme.

9. A Ethernet Connectivity Fault Management (CFM) monitoring system associated with an access network, wherein said access network includes at least one access node connected to one or more end nodes and a broadband access server (BRAS) connected to an Authentication, Authorization and Accounting (AAA) server in a regional Ethernet network, comprising:

means associated with said BRAS for generating an Ethernet Connectivity Fault Management (CFM) frame responsive to an action from the AAA server in the regional Ethernet network directed to an access node, wherein said Ethernet CFM frame includes a query message with respect to a particular end node served by said access node;

interworking function (IWF) means associated with said access node for interpreting said Ethernet CFM frame and constructing a corresponding query message in a native protocol compatible with respect to said particular end node; and means associated with said particular end node, operable responsive to said corresponding query message from said access node, for generating a reply message in said native protocol directed to said access node, wherein said IWF means operates to interpret said reply message in said native protocol and constructs a reply Ethernet CFM frame including a response that corresponds to said reply message, said reply Ethernet CFM frame for transmission to said BRAS; and wherein the BRAS generates a message to the AAA server responsive to the reply Ethernet CFM frame.

10. The monitoring system associated with an access network as recited in claim 9, wherein said means for generating said Ethernet CFM frame is operable responsive to a port query message from the AAA server operably coupled to said access network.

11. The monitoring system associated with an access network as recited in claim 9, wherein said native protocol is operable with Ethernet in First Mile (EFM) Operations, Administration and Management (OAM) messaging.

12. The monitoring system associated with an access network as recited in claim 9, wherein said native protocol is operable with Asynchronous Transfer Mode (ATM) Operations, Administration and Management (OAM) messaging.

13. The monitoring system associated with an access network as recited in claim 9, wherein said IWF means associated with said access node comprises a Maintenance End Point (MEP) that is part of an Ethernet CFM domain defined on a Virtual Local Area Network (VLAN).

14. The monitoring system associated with an access network as recited in claim 13, wherein said VLAN is operable with a 1:1 port addressing scheme.

15. The monitoring system associated with an access network as recited in claim 13, wherein said VLAN is operable with an N:1 port addressing scheme.

16. The monitoring system associated with an access network as recited in claim 9, wherein said particular end node comprises a Digital Subscriber Line (DSL) modem port.

17. The monitoring system associated with an access network as recited in claim 9, wherein said particular end node comprises a residential gateway (RG) port.

18. The monitoring system associated with an access network as recited in claim 9, wherein said particular end node comprises a network termination (NT) port.

* * * * *